(12) United States Patent
Mann et al.

(10) Patent No.: US 8,594,937 B2
(45) Date of Patent: Nov. 26, 2013

(54) CONTINUOUS GRAVITY SURVEY OF A BOREHOLE

(75) Inventors: Ethan H. Mann, Broomfield, CO (US); Jeffrey D. MacQueen, Centennial, CO (US); Daniel Aliod, Broomfield, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 424 days.

(21) Appl. No.: 12/832,643

(22) Filed: Jul. 8, 2010

(65) Prior Publication Data
US 2012/0010817 A1  Jan. 12, 2012

(51) Int. Cl.
*G01V 3/18* (2006.01)
*G01V 3/26* (2006.01)
*G01V 3/34* (2006.01)
*G06F 3/01* (2006.01)

(52) U.S. Cl.
USPC .............. 702/6; 702/14; 702/17; 702/127

(58) Field of Classification Search
USPC .......... 702/6, 14, 17, 127, 136, 152, 189; 73/152.05; 356/496
See application file for complete search history.

(56) References Cited

U.S. PATENT DOCUMENTS

| | | | |
|---|---|---|---|
| 2,899,826 A | | 8/1959 | LaCoste |
| 3,474,672 A | | 10/1969 | LaCoste et al. |
| 3,717,036 A | | 2/1973 | LaCoste |
| 3,926,054 A | * | 12/1975 | Buck ......................... 73/382 R |
| 4,040,189 A | | 8/1977 | LaCoste |
| 4,475,386 A | * | 10/1984 | Fitch et al. ................. 73/382 R |
| 4,596,139 A | * | 6/1986 | Gournay ..................... 73/152.05 |
| 4,602,508 A | | 7/1986 | Fitch et al. |
| 4,625,547 A | * | 12/1986 | Lyle, Jr. ..................... 73/152.05 |
| 4,718,168 A | | 1/1988 | Kerr |
| 4,852,263 A | | 8/1989 | Kerr |
| 5,155,922 A | | 10/1992 | Cooper |
| 5,541,587 A | | 7/1996 | Priest |
| 6,671,057 B2 | * | 12/2003 | Orban ........................ 356/496 |
| 6,704,655 B2 | | 3/2004 | Kelly |
| 7,069,780 B2 | | 7/2006 | Ander |
| 7,093,370 B2 | | 8/2006 | Hansberry et al. |
| 7,142,985 B2 | | 11/2006 | Edwards |
| 8,113,042 B2 | * | 2/2012 | Donadille et al. ......... 73/152.05 |

OTHER PUBLICATIONS

H. D. Valliant and R. V. Cooper, Position Measurements with the LaCoste and Romberg Air/Sea Gravimeter, Geophysics, vol. 46, No. 1, Jan. 1981, pp. 40-44.

Lucien Lacoste, Neal Clarkson, George Hamilton, LaCoste and Romberg Stabilized Platform Shipboard Gravity Meter, Geophysics, vol. XXXII, Feb. 1967, pp. 99-109.

Alan T. Herring, Edcon, Inc., Introduction to Borehole Gravity, Feb. 1990, 4 pages, available at http://www.microglacoste.com/bhg-intro.htm.

Lucien J. B. Lacoste, LaCoste & Romberg, Gravity Measurements from a Moving Platform, IEEE International Convention Record Part 9, 1963, pp. 18-24.

* cited by examiner

*Primary Examiner* — Sujoy Kundu
*Assistant Examiner* — Felix Suarez
(74) *Attorney, Agent, or Firm* — John R. Ley (57) ABSTRACT

Gravity measurements from a borehole gravity survey are obtained by continuously moving the gravity meter within the borehole. Movement-induced acceleration errors are quantified and subtracted from the gross measurements from the gravity meter to obtain actual gravity values at a multitude of measurement points within the borehole. Acceleration errors are calculated from the second differential of the true vertical depth of the gravity meter, which is computed measured length and weight and elongation characteristics of a cable which suspends the gravity meter in the borehole, upper and lower tension measurements in the cable, and the topography of the borehole.

20 Claims, 8 Drawing Sheets

CONTINUOUS GRAVITY SURVEY OF A BOREHOLE

This invention relates to measuring gravity within a borehole. More particularly, the present invention relates to a new and improved gravity survey of a borehole in which accurate gravity measurements are obtained using a gravity meter which is continuously moving within the borehole, thereby avoiding the requirement to stop and stabilize the gravity meter at each measurement point to obtain accurate gravity measurements.

BACKGROUND OF THE INVENTION

A borehole is typically used to access subterranean areas of interest beneath the surface. In many cases, data recording devices are lowered into the borehole to gather additional information about the subterranean structure and composition of subterranean material surrounding the borehole but not directly accessed by the borehole, at certain preselected depths. The measurements are then used to model the subterranean area of interest.

Of particular interest to geologists, geophysicists, civil and petroleum engineers, and others, is the density of material within certain subterranean areas. The density of a particular subterranean area can often be related to the presence of hydrocarbon (oil and gas) deposits. The density of a particular subterranean area can also be indicative of the ability of the subterranean area to support heavy structures, such as buildings and bridges.

One way to determine the density of a subterranean area is to measure gravity within the subterranean area. Gravity has a well known relationship with material density, so the density of a particular subterranean area can be evaluated from gravity measurements of that subterranean area. Gravity meters are commonly used to derive density information. Gravity meters offer certain advantages when measuring gravity compared to other types of density-related measurement devices, because gravity meters are not as affected by near-hole anomalies, such as washouts, borehole casing variations or fluid invasion, as are other measurement devices. Gravity meters also have a superior range of measurement compared to other measurement devices. The range of measurement of a typical gravity meter extends outward over one hundred feet from the borehole.

Gravity measurements are taken from a borehole as part of a borehole gravity survey. The gravity survey usually extends over a significant length or depth of the borehole. The gravity survey typically starts by lowering a pressure housing containing the gravity meter, known as a sonde, to a preselected starting depth within the borehole. The sonde is connected to a cable which is wound around a motorized take-up spool at the earth surface. The motorized spool is rotated to raise and lower the sonde within the borehole. An odometer is connected with the cable or spool to measure the length of cable inserted into the borehole and determine subsequent depth of the gravity meter within the borehole. After the sonde has been lowered to the preselected starting depth or measurement point, a gravity measurement is obtained from the gravity meter. The sonde is then raised a predetermined interval or distance, for example 10-30 feet, to another predetermined measurement point, where another gravity measurement is taken after sufficient time has elapsed to allow the sonde to stabilize in position and all extraneous movements of the sonde and the cable have dampened out. Additional gravity measurements are taken in this same manner at the other measurement points until the entire borehole gravity survey is completed.

Gravity meters determine the value of gravity by measuring the effect of gravity on a test mass within the gravity meter. Different types of gravity meters measure the effect of gravity on the test mass in different ways, but all gravity meters measure a force (gravity) acting on the test mass. For example, some relative gravity meters suspend the test mass from a spring and measure the displacement of the test mass as the spring stretches. The displacement of the test mass is proportional to the force of gravity acting on the test mass. Other relative gravity meters maintain the test mass stationary and measure an electric or magnetic force required to maintain the test mass in a stationary position. The amount of electric or magnetic force is proportional to gravity. Absolute gravity meters typically measure the acceleration of the test mass as it is released into a free fall. The acceleration of the test mass is directly related to the force of gravity acting on the test mass.

Movement of a gravity meter during measurement can create an inaccurate gravity measurement. Changes in movement of the gravity meter result in acceleration which itself causes a force on the test mass. In such circumstances, the force acting on the test mass results both from movement-induced acceleration and from gravity. A movement-induced acceleration therefore causes an acceleration error in the gravity meter measurement. By stopping the sonde and allowing the gravity meter to stabilize, movement-induced acceleration errors on the gravity meter measurements are eliminated. The stopped and stabilized gravity meter measures only gravity, because there are no movement-induced acceleration errors.

Movement-induced acceleration errors in the gravity meter measurements are unavoidable when the measurements are taken as the gravity meter is moving in the borehole. Movement-induced acceleration errors are due to changes in movement of the sonde and the cable which suspends it in the borehole. The diameter of the sonde is smaller than the inside diameter of a casing which typically lines the borehole, and the sonde and the cable occasionally contact the casing as they move up or down in the borehole. Additionally, the sonde and cable may encounter debris or fluid within the borehole. Under these circumstances, the sonde may occasionally experience momentary resistances to movement as the cable is moved in the borehole due to frictional contact of the sonde or the cable with the casing or due to the sonde encountering the debris or fluid within the borehole. These disturbances of the sonde create erratic forces which create acceleration of the sonde. The cable is made of material which has a natural elasticity characteristic, such as steel, causing the cable to behave as a spring in accordance with Hooke's law. Hooke's law states that the amount of stretch of a spring is proportional to the amount of force applied to the spring. The intermittent changes in tension or force in the cable caused by disturbances and perturbations cause slight spring-like oscillations in the cable, and these oscillations also engender movement-induced acceleration on the test mass of the gravity meter. Other factors may also cause acceleration of the sonde and cable in the borehole.

The prior art technique of moving the sonde from one preselected stationary measurement point to the next preselected stationary measurement point is accomplished by raising or lowering the cable within the borehole a predetermined distance. Raising and lowering the cable causes the cable to transition between stationary and moving states, which in turn changes the tension within the cable. Due to the spring-like characteristics of the cable, the length of the cable changes during the transition between stationary and moving states, which results in the sonde oscillating or bouncing slightly at the end of the cable for a period of time after each movement point transition. Similar to the oscillations of the sonde at the end of the cable, moving the sonde from one stationary position to another causes the test mass to oscillate slightly at the end of the spring which suspends the test mass. It is for these reasons that a considerable waiting time is required at each measurement point to allow movement of the test mass and the sonde to dampen out and stabilize before the gravity measurement is made. The cumulative amount of time elapsed during these wait periods at each preselected measurement depth constitutes a large portion of the overall time to conduct the borehole gravity survey, typically in excess of 50% of the total time required to complete the entire survey.

Conducting a borehole gravity survey may take up to three or four days depending on the depth of the borehole and the interval of the gravity measurement points. Production of oil and gas and/or drilling in the borehole must be halted when conducting a borehole gravity survey of a producing well, because the movement of fluids around the sonde also perturbs the sonde and introduces acceleration errors into the gravity measurements. Halting the production of a producing well can cost up to $20,000 per hour for high capacity wells. Reducing the time required to conduct a gravity survey of a borehole has the potential for significant cost savings.

It has previously been recognized that it would be desirable to make continuous gravity measurements in a borehole. However, such continuous gravity measurements were recognized as unreliable since there was no known accurate way to quantify and eliminate the effects of movement-induced acceleration on the gravity meter. Consequently, it was previously considered impractical to obtain accurate gravity measurements from a continuously moving gravity meter in a borehole.

SUMMARY OF THE INVENTION

The present invention obtains continuous accurate gravity measurements while the gravity meter is continuously moving within the borehole, without stopping the movement at specific measurement points. Consequently, the amount of time required to conduct a borehole gravity survey using a gravity meter is substantially reduced. The present invention permits the accurate identification and quantification of movement-induced acceleration errors while the sonde is moving continuously in the borehole, thereby quantifying the degrading effects of acceleration errors and allowing the acceleration errors to be subtracted or removed from the gross gravity meter measurements to obtain accurate actual gravity measurements or values. Significant time and cost savings result from performing the borehole gravity survey on a continuous basis without compromising the accuracy of the gravity measurements.

One aspect of the present invention involves a method of conducting a borehole gravity survey. The method involves continuously moving the gravity meter within the borehole along a predetermined measurement length over which the gravity survey is conducted, taking gross gravity meter measurements from the gravity meter at measurement points along the measurement length while continuously moving the gravity meter, determining the true vertical depth of the gravity meter within the borehole at each measurement point, determining vertical acceleration errors of the gravity meter at each measurement point, and subtracting the vertical acceleration errors of the gravity meter from the gross gravity meter measurements at each measurement point to obtain accurate actual gravity values at each measurement point.

Other aspects of the present invention involve establishing a coordinate system in three dimensional space having perpendicular X and Y horizontal axes which are orthogonal to a vertical Z axis and obtaining borehole topography information as the gravity meter is continuously moving within the borehole by determining coordinates along the X and Y axes of the borehole at a plurality of different depths of the borehole, and measuring an acceleration of the gravity meter along the X and Y axes as the gravity meter is continuously moving within the borehole, and double integrating the measured acceleration of the gravity meter along the X and Y axes to determine the coordinates of the borehole along the X and Y axes at the plurality of different depths of the borehole.

Another aspect of the present invention involves connecting the gravity meter to a stabilized platform within an interior of a sonde. The stabilized platform is pivotally connected to a gimbal ring which is pivotable about a first axis. The gimbal ring is pivotally connected to the interior of the sonde to pivot about a second axis, orthogonal to the first axis. Motors pivot the stabilized platform in response to pivot signals to maintain the gravity meter in a vertical orientation as the gravity meter is moved along the predetermined measurement length of the borehole.

Even further aspects of the present invention involve smoothing the calculated acceleration errors with a smoothing algorithm prior to calculating the actual gravity values and smoothing the gravity measurements with a smoothing algorithm prior to calculating the actual gravity values.

A more complete appreciation of the present invention and its scope may be obtained from the accompanying drawings, which are briefly summarized below, from the following detailed description of a preferred embodiment of the invention, and from the appended claims.

DETAILED DESCRIPTION

Figure 1:
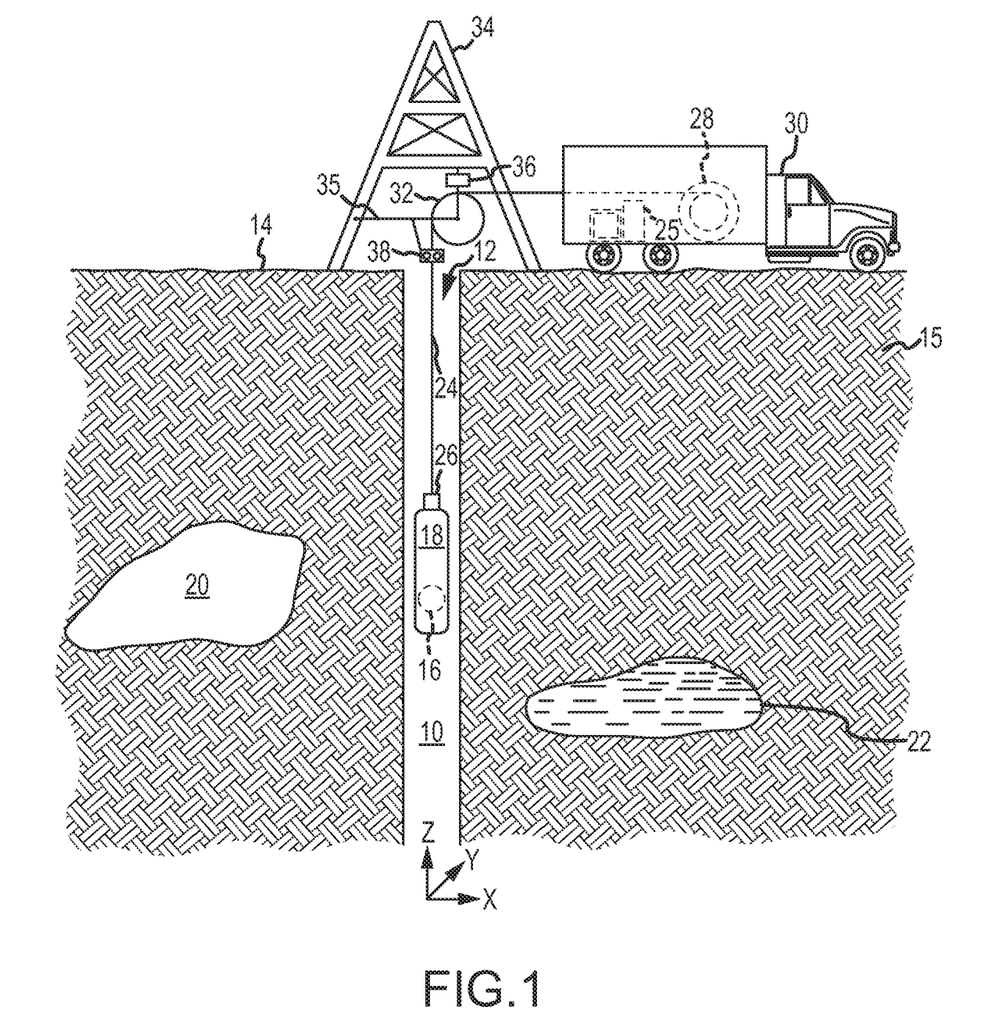
FIG. 1 is an illustration of making gravity measurements in a borehole formed in surrounding earth, in accordance with the present invention.

The present invention involves continuously obtaining gravity survey information which permits accurate and reliable determinations of the force of gravity over the vertical length of part or all of a borehole 10, such as that shown in FIG. 1. The borehole 10 extends vertically downward from an opening 12 at the surface 14 of the earth 15. A gravity meter 16 is contained within a pressure housing or sonde 18. The gravity meter 16 and the sonde 18 are moved continuously without stopping in the borehole 10 while obtaining the necessary gravity survey information to determine the force of gravity over a selected length or depth of the borehole 10. The information obtained constitutes a gravity survey. The gravity survey is preferably conducted from a predetermined lowermost position in the borehole to a predetermined uppermost position in the borehole 10, and the entire gravity survey is preferably completed while the gravity meter 16 and sonde 18 are moving continuously.

As the gravity meter 16 and sonde 18 move in this continuous manner, gross gravity meter measurements are obtained from the gravity meter 16 at each of multiple different measurement points within the borehole 10. Additionally, acceleration related error measurements which correlate to the vertical acceleration of the gravity meter 16 are obtained at each of multiple different measurement measurement points within the borehole 10. The gross gravity meter measurements and the acceleration error values are referenced or correlated to the measurement points, and the force of gravity is calculated at each measurement point by subtracting the acceleration value representing the vertical acceleration of the sonde 18 as the sonde 18 moved through the particular measurement point from the gross gravity meter measurement taken from the gravity meter as the sonde 18 moves through that particular measurement point.

The force of gravity at a particular depth within the borehole 10 is directly related to the density of the surrounding earth 15 at that depth. The force of gravity is correlated to subterranean density using known techniques. Knowledge of the relative density of the surrounding earth at different depths within the borehole 10 is used for many different purposes, such as to identify the existence and location of subterranean structures exemplified by a cavern 20 or an oil deposit 22, or to determine the suitability of the subterranean structure for various uses and purposes.

A cable 24 is used to lower and raise the sonde 18 within the borehole 10, as shown in FIG. 1. The cable 24 includes both load bearing strands and communications conductors (neither specifically shown). The communications conductors communicate signals, including the gross gravity meter measurements, between the sonde 18 and conventional data recording equipment 25 at the surface 14. The load bearing strands of the cable 24 support the weight of the sonde 18 and the cable 24 in the borehole 10. The upper portion of the cable 24 is wrapped around a motorized take-up and pay-out spool 28. The motorized spool 28 is typically located within a cable truck 30 at the surface 14. The motorized spool 28 rotates in one direction to pay-out or extend the cable 24 into the borehole 10 and in another direction to take-up or raise the cable 24 from the borehole 10. The cable 24 extends from the truck 30 and bends around an alignment pulley 32. The alignment pulley 32 directs the cable 24 from the motorized spool 28 into the opening 12 of the borehole 10. The alignment pulley 32 is suspended from a support or tower 34. The sound 18 is connected to a lower end of the cable 24.

The gravity meter 16 used in conjunction with the present invention preferably has a range of approximately 10 to 20 Gals, which is about twice as large as standard surface-based gravity meters. The larger range is desirable to accurately record the larger movement-induced acceleration forces to which the gravity meter 16 is subject to while moving within the borehole.

Figure 2:
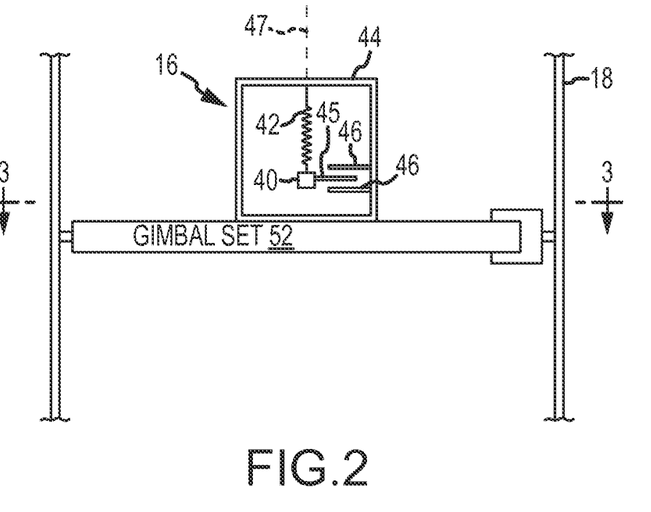
FIG. 2 is a generalized, partial, broken-out side elevational view of a gravity meter on a stabilized platform within a sonde shown in FIG. 1.

The gravity meter 16 is a conventional relative gravity meter which has been sized to fit within the sonde 18. The gravity meter 16 is generally shown in FIG. 2. The gravity meter 16 uses a test mass 40 hanging from a calibrated spring 42 attached to a housing 44 of the gravity meter 16. Gravity exerts a downward force on the test mass 40 in direct relation to the strength of the gravity. Changes in gravity cause proportional changes in the downward forces acting on the test mass. A conductive plate 45 is connected to the test mass 40 and moves or floats in the space between fixed conductive plates 46 attached to the housing 44 as the test mass 40 moves vertically with respect to the housing 44. The floating plate 45 maintains a parallel orientation with the fixed plates 46 as the floating plate 45 moves in the space between the fixed plates 46.

Control circuitry (not shown) within the gravity meter applies different voltages to the floating plate 45 and the fixed plates 46 to electrically charge the fixed plates 46 to different energy levels. The electrical charges on the fixed plates 46 exert a movement force on the floating plate 45. The control circuitry senses the relative position of the floating plate 45 with respect to the fixed plates 46 using conventional capacitive position indicator, optical or other techniques. The control circuitry attempts to maintain the floating plate 45 at an equilibrium position equidistant from both fixed plates 46 using the sensed position as control feedback. The control circuitry determines a control error representing the deviation of the sensed position of the floating plate 45 from the equilibrium position, by subtracting and/or adding values or signals representing the sensed relative position of the floating plate 45 from values or signals representing the equilibrium position of the floating plate 45. The control circuitry then uses the determined control error to vary the relative voltage potentials of the fixed plates 46. The amount of voltage potentials or effort needed to maintain the floating plate 45 at the equilibrium position is directly related to the acceleration force acting on the test mass. A gross gravity meter measurement is thereby derived. The gravity meter 16 sends a signal representing the gross gravity meter measurement through the communication conductor in the cable 24 to the data recording equipment 25.

The relative gravity meter 16 with the described fixed and floating plates and equidistant control system limits the range of movement of the test mass 40 to a very small range of vertical movement, which greatly limits the amount of stretch the spring 42 is subjected to during use, compared to relative gravity meters which allow the test mass to extend or retract freely. The useful service life of the gravity meter 16 is therefore extended and the time between required calibrations due to drift or spring stretch is likewise increased. Other types of gravity meters could also be used with the present invention.

An odometer 38 is positioned in contact with the cable 24 at the surface 14 to indicate the length of the cable 24 between the alignment pulley 32 and the gravity meter 16 in the sonde 18. The value from the odometer 38 represents the length of the cable 24 that has been paid out from the spool 28 and inserted into the borehole 10. The short distance between the lower end of the cable 24, where it connects to the sonde 18 and the distance from that connection point to the gravity meter 16 within the sonde 18 is taken into account in establishing the tare of the odometer 38. The distance indicated by the odometer 38 is referred to herein as the "indicated cable length." The cable length indicated by the odometer 38 is therefore the cable length or distance that the gravity meter 16 is from the earth surface 14. The signals indicated by the odometer 38 are communicated to the data recording equipment 25 by conductors extending therebetween as well as to a conventional feedback motor speed control system (not shown) associated with the motor (also not shown) which rotates the motorized spool 28.

The details of practicing the present invention involve obtaining gross gravity meter measurements from the gravity meter 16 while the gravity meter 16 is moving within the borehole, continually orienting the gravity meter relative to a vertical reference since gravity is measured with respect to a vertical reference, determining the location of the gravity meter within the borehole 10 at each measurement point, calculating acceleration errors of the sonde 18 caused by changes, perturbations or disturbances in the constant vertical movement rate of the sonde 18 at each measurement point, and calculating accurate actual gravity values free of the acceleration errors at each measurement point. The details by which the present invention accomplishes these tasks are described below.

The sonde 18 is generally shaped like a cylinder having a diameter that is smaller than the smallest expected diameter of the borehole 10 so that the sonde 18 may be positioned and moved within the borehole 10 relatively free from obstructions and restrictions. The sonde 18 has a length which is measured along its cylindrical axis. In general, the length of the sonde 18 is considerably greater than its diameter, causing the sonde 18 to always be oriented in substantial alignment with the orientation of the borehole 10 at the location of the sonde.

To obtain gross gravity meter measurements which are as accurate as possible as the sonde 18 is continuously moving in the borehole 10, the axis 47 (FIG. 2) of the gravity meter 16 is aligned vertically since gravity is defined with respect to the vertical. Alignment in a non-vertical axis detracts from an accurate measurement. Deviation of the axis 47 (FIG. 2) of the gravity meter from vertical results in an error in the gross gravity meter measurements proportional to the cosine of the angle of deviation.

A typical borehole is not usually precisely vertical throughout its entire length or depth. Consequently, the longitudinal axis of the sonde 18 may deviate from vertical when the borehole 10 deviates from vertical. To avoid fixing the alignment of the vertical axis 47 (FIG. 2) of the gravity meter 16 with the axis of the sonde 18 when the sonde 18 is in a non-vertical orientation in a deviated wellbore, the gravity meter 16 must be pivotable in the X and Y horizontal axes.

Figure 3:
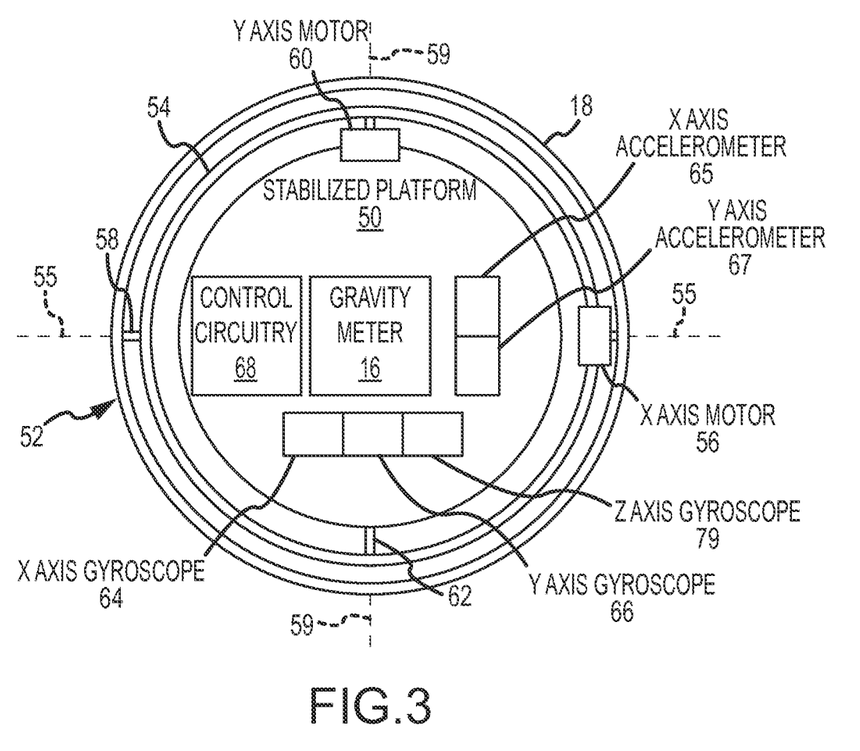
FIG. 3 is generalized sectional view taken substantially in the plane of line 3-3 in FIG. 2.

The vertical axis 47 (FIG. 2) of the gravity meter 16 is maintained in a vertical orientation by mounting the gravity meter 16 on a stabilized platform 50, as shown in FIG. 3. The stabilized platform 50 is kept continuously horizontal by attaching it to a gimbal set 52 which permits the stabilized platform 50 to assume a horizontal orientation even when the longitudinal axis of the sonde 18 is not vertical. The gravity meter 16 is preferably oriented on the stabilized platform 50 so that the vertical axis 47 of the gravity meter 16 is perpendicular or orthogonal to the stabilized platform 50. The vertical axis 47 of the gravity meter 16 is oriented vertically by movement of the stabilized platform 50.

The gimbal set 52 includes a ring 54, which is pivotally connected to the sonde 18 to pivot about a single axis 55 (the "X axis") that extends transversely and preferably perpendicularly with respect to the longitudinal axis of the sonde 18. A conventional X axis motor 56 connects one portion of the ring 54 to the sonde 18, and a shaft 58 connects an opposite portion of the ring 54 to the transversely opposite part of the sonde 18. The connections of the X axis motor 56 and shaft 58 to the sonde 18 establish the X axis 55 about which the gimbal set 52 pivots. The X axis motor 56 controls the amount of pivot of the ring 54 about the X axis 55 with respect to the sonde 18.

The stabilized platform 50 is pivotally connected to the ring 54 to pivot about a single axis 59 (the "Y" axis) with respect to the ring 54. A conventional Y axis motor 60 connects the stabilized platform 50 to the ring 54 and a shaft 62 connects a transversely opposite portion of the stabilized platform 50 to a transversely opposite portion of the ring 54. The connections of the Y axis motor 60 and the shaft 62 to the ring 54 establish the Y axis 59 of pivoting movement of the stabilized platform. The Y axis motor 60 controls the amount of pivoting of the stabilized platform 50 with respect to the ring 54. The Y axis 59 is perpendicular to the X axis 55. The X axis motor 56 and the Y axis motor 60 are therefore able to control the stabilized platform 50 to maintain a horizontal orientation despite changes in the orientation of the sonde 18 in the borehole 10.

Figure 4:
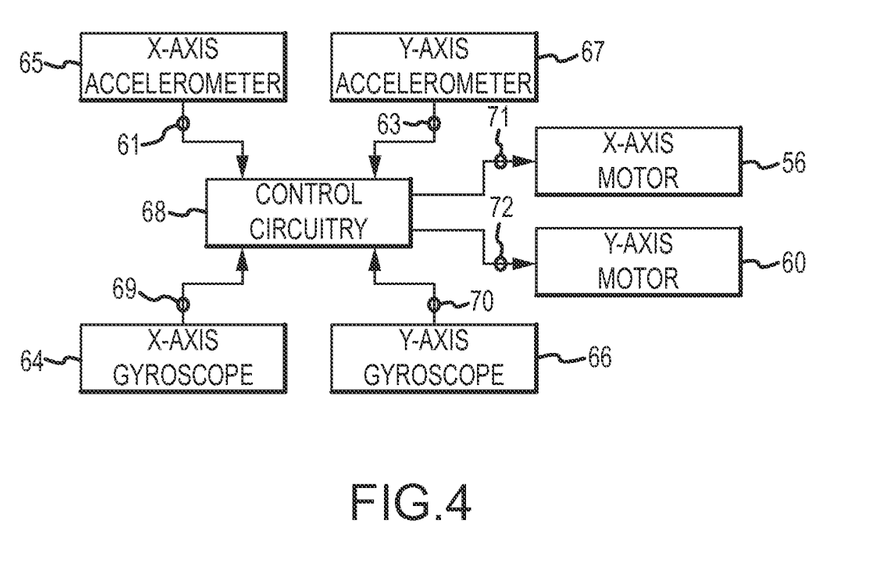
FIG. 4 is generalized block diagram of a control system for the stabilized platform shown in FIGS. 2 and 3.

A conventional X axis gyroscope 64, a conventional Y axis gyroscope 66, a conventional X axis accelerometer 65, a conventional Y axis accelerometer 67 and control circuitry 68 are also preferably mounted to the stabilized platform 50, as shown in FIGS. 3 and 4, along with the gravity meter 16.

The X axis gyroscope 64 detects the amount of pivoting movement of the stabilized platform 50 about the X axis 55 and supplies an error signal 69 to the control circuitry 68 representing the amount of pivot of the stabilized platform 50 about the X axis 55. The Y axis gyroscope 66 detects the amount of pivoting movement of the stabilized platform 50 about the Y axis 59 and supplies an error signal 70 to the control circuitry 68 representing the amount of pivot of the stabilized platform 50 about the Y axis 59. The error signals 69 and 70 from the gyroscopes 64 and 66 represent the extent to which the stabilized platform 50 is deviated from a horizontal orientation.

The X axis accelerometer 65 detects acceleration along the X axis 55 and supplies a signal 61 to the control circuitry 68 representing the acceleration of the accelerometer 65 along the X axis 55. The Y axis accelerometer 67 detects acceleration along the Y axis 59 and supplies a signal 63 to the control circuitry 68 representing the acceleration of the accelerometer 67 along the Y axis 59. The control circuitry 68 uses the accelerometer signals 61 and 63 to correct the gyroscopic signals 69 and 70 for errors induced by the rotation of the earth and general gyroscopic drift, in accordance with known techniques.

The control circuitry 68 uses a conventional feedback control algorithm to supply motor control signals 71 and 72 to the X axis motor 56 and the Y axis motor 60 in response to the error signals 69 and 70 from the gyroscopes 64 and 66 and the signals 61 and 63 from the accelerometers 65 and 67, respectively. When the gyroscopes 64 and 66 detect the deviation of the stabilized platform 50 from horizontal, one or both error signals 69 and 70 is/are sent to the control circuitry 68. The control circuitry 68 responds to the error signals 69 and 70 and determines the appropriate output motor control signals 71 and 72 to cause the motors 56 and 60 to restore the stabilized platform 50 to horizontal, thereby maintaining the stabilized platform 50 in the desired horizontal orientation. In this manner, the stabilized platform 50 is controlled to maintain the horizontal orientation. The error signals 69 and 70 and the motor control signals 71 and 72 are supplied over conventional conductors which have minimal physical resistance to movement, or the signals may be supplied wirelessly between conventional transmitters and receivers using a wireless communications protocol.

Since the stabilized platform 50 is always in a substantially horizontal plane, the vertical axis 47 of the gravity meter 16 is maintained substantially vertically. The response of the control circuitry 68 is rapid enough to maintain the stabilized platform 50 horizontal for an anticipated maximum deviation of the sonde 18 from vertical as the sonde 18 moves within the borehole 10.

The cable 24 is preferably raised from the borehole 10 at a constant speed or linear rate. Raising the cable 24 at a constant speed is achieved by controlling and adjusting the rotational rate of the motorized spool 28 to maintain a constant rate of movement of the cable through the odometer 38, in response to signals supplied by the odometer 38 and the stretched the length of the cable. The constant rate of cable movement helps to avoid inducing acceleration influences on the gravity meter 16 that cause acceleration errors. Accelerations caused by changes in velocity of the sonde 18 create the same effect as gravity, and are measured by the gravity meter 16 as gross gravity meter measurements. Thus, any acceleration effects on the sonde 18 cause errors in the gravity measurements. Moving the cable 24 at a constant rate helps eliminate or reduce such acceleration errors, but some variations in velocity of the sonde 18 are inevitable and must be quantified to obtain actual gravity values, as discussed below.

When the sonde 18 is subject to a disturbance (such as increased friction with the casing of the borehole or debris in the borehole, among other factors) as the cable 24 is being raised at a constant speed, the cable 24 briefly stretches and the tension within the cable increases while the sonde is hung up on or delayed by the disturbance. Eventually, the increased tension within the cable 24 creates enough upward force to break the sonde 18 free from the disturbance. When the sonde 18 is freed from the disturbance, the increased tension in the cable is relieved as the sonde 18 accelerates upward due to the increased cable tension and the spring effect from the cable. Eventually, the increased tension in the cable is relieved due to the acceleration of the sonde 18 and the sonde 18 starts decelerating. This spring effect of the cable causes an oscillation in speed of the sonde 18 relative to the constant velocity of the cable movement created by the motorized spool 28. The oscillation continues until dampened by the inherent energy absorbing characteristics of the cable. The vertical oscillation of the sonde 18 and the cable 24 is similar in principle to an oscillation or vibration of a mass suspended from a long elastic band after the elastic band has been stretched and released.

A similar vertical oscillation effect occurs when disturbances on the sonde 18 are induced by lateral vibrations in the cable, similar to the lateral vibration of a piano or guitar string. Lateral vibrations of the cable induce slight vertical oscillations of the gravity meter 16 and sonde 18 in a manner similar to the longitudinal spring oscillations of the cable just described, because the lateral oscillations slightly change the length of the cable as the cable vibrates from side to side through a central neutral location with each vibration.

The oscillations of the cable 24 dampen out over time, but new disturbances induced other or further sporadic oscillations of the sonde 18 in the vertical direction. The gravity meter 16 and the sonde 18 may thus experience continually varying vertical acceleration as the cable 24 is extracted from the borehole 10. The gravity meter and acceleration related measurements are preferably taken as the cable 24 is raised within the borehole 10 after being lowered to a desired starting depth. It is believed that the sonde 18 is subject to a smaller range of perturbance related acceleration errors as the cable 24 is raised from the borehole 10 compared to when the cable 24 is lowered into the borehole 10.

The gravity meter 16 cannot distinguish between gravitational force acting on the test mass 40 and vertical acceleration effects on the test mass 40 due to oscillations of the cable 24 or other perturbations. As a result, vertical acceleration of the sonde 18 results in acceleration errors within the gross gravity meter measurements obtained from the gravity meter 16. These acceleration errors must be removed from the gravity measurements in order to obtain accurate gravity measurement values. To remove the errors caused by accelerations of the sonde, the acceleration errors must be accurately quantified. The vertical acceleration of the gravity meter must be quantified for each measurement point indirectly, since the vertical acceleration of the gravity meter cannot be measured directly by the gravity meter independently of the force of gravity. Vertical acceleration values representing the vertical acceleration of the gravity meter at each of the measurement points are calculated from true vertical depth values, which represent the true vertical depth of the gravity meter at the measurement points. By correlating the true vertical depth values with time, the vertical acceleration of the gravity meter at each measurement point is determined from the second differential of the true vertical depth values with respect to time.

The true vertical depth values corresponding to the vertical depth of the gravity meter at the measurement points are determined from a combination of an actual downhole cable length and borehole topography information. In the simplest case where the borehole is precisely vertical, the true vertical depth values are the actual downhole cable lengths. The derivation of the true vertical depth values from the actual downhole cable lengths and the borehole topography information are calculated using known techniques. The actual downhole cable length at any point in time while the sonde 18 is moving within the borehole is close to, but rarely exactly equal to, the odometer indicated cable length from the odometer 38, as explained below and shown in connection with FIGS. 1 and 5.

Many boreholes are intentionally or unintentionally deviated from vertical, or the borehole may have one or more deviated segments combined with other segments that are substantially vertical. In order to calculate the vertical depth of the gravity meter 16 and sonde 18 from the actual downhole cable length in a deviated borehole, the borehole topography or geometry must previously be known or determined while performing the gravity survey. The borehole topography specifies the positions, angular orientations and lengths of adjacent segments of the borehole. The borehole topography is typically mapped or recorded in conjunction with, or soon after, drilling the borehole, using known techniques. The borehole topography can be defined mathematically, by a function which correlates the actual downhole cable length with a true vertical depth.

Figure 5:
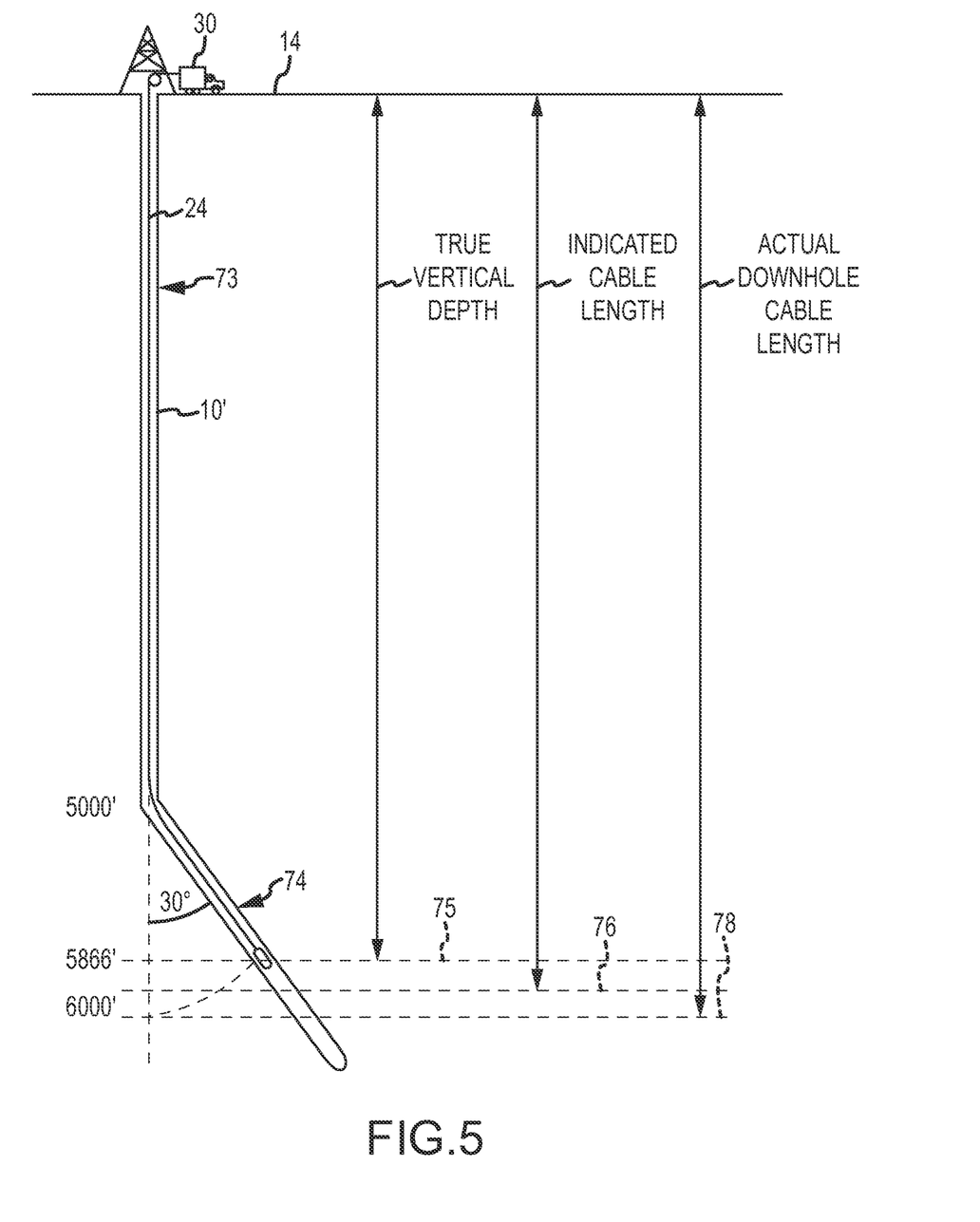
FIG. 5 is an exaggerated illustration of a deviated borehole similar to the borehole shown in FIG. 1, comparing a true vertical depth of the gravity meter within borehole, an indicated length of cable within the borehole to the gravity meter, and an actual downhole cable length to the gravity meter within a borehole.

A comparison of the true vertical depth relative to the indicated cable length and the actual downhole cable length is illustrated by the example shown in FIG. 5. The borehole 10' has a vertical segment 73 and a non-vertical deviated segment 74. The vertical segment 73 is known from the borehole topography to have a length of 5000 feet, and the deviated segment 74 is known from the borehole topography to have a length of over 1000 feet. In addition, the borehole topography indicates that the deviated segment 74 angles 30° from vertical. The sonde 18 is shown within the deviated segment 74 of the borehole 10. The true vertical depth is shown at 75, the indicated cable length is shown at 76, and the actual downhole cable length is shown at 78. The true vertical depth 75 is the actual vertical distance of the sonde 18 from the surface 14. The indicated cable length 76 is the distance corresponding to the odometer value from the odometer 38 (FIG. 1). The actual downhole cable length 78 is shown as different from the indicated cable length 76 supplied by the odometer 38 (FIG. 1) due to a temporary and momentary stretch and increase in tension of the cable 24.

In the example shown in FIG. 5, the actual downhole cable length 78 is calculated to be 6000 feet. The first 5000 feet of the actual downhole cable length from the surface 14 reside in the vertical segment 73, and therefore the first 5000 feet of actual downhole cable length has a vertical distance of 5000 feet. The next 1000 feet of the actual downhole length of the cable 24 is within the deviated segment 74. The vertical distance of actual downhole length of the cable is 1000 cos (30°)=866 feet. Adding the actual downhole vertical lengths of the cable 24 within the borehole segments 73 and 74 results in a vertical depth of 5866 feet, which is the true vertical depth 75 of the sonde 18 and the gravity meter 16 within the sonde 18.

A typical cable 24 will have a characteristic elongation or spring characteristic which describes the degree to which the cable 24 stretches in a predetermined relation to the amount of tension force applied between opposite ends or segments of a known length of the cable 24. The degree of stretch of the cable 24 is directly proportional to the amount of force or tension applied to the cable 24, the characteristic spring coefficient or non-deforming elongation coefficient of the cable, and the distance between the points where the tension is applied to the cable, in accordance with known principles.

The actual downhole cable length cannot be assured to equal the odometer indicated cable length from the odometer 38 except when the cable 24 and the sonde 18 are stationary and stabilized. Movement of the cable 24 and sonde 18 results in acceleration of the sonde 18, which causes deviations between the actual downhole cable length 78 and the odometer indicated cable length 76. When the cable 24 and the sonde 18 are stationary and not otherwise subject to disturbances (i.e., in an equilibrium state), the actual downhole cable length 78 equals the odometer indicated cable length 76.

The cable 24 is modeled as a spring according to Hooke's law shown in Equation (1):

$$F = kX_S \qquad (1),$$

where F is the force exerted on the cable, k is a spring or non-deforming elongation constant, and $X_S$ is the stretch of the cable from an equilibrium position. The equilibrium position of the sonde 18 is indicated by the odometer indicated cable length 76 from the odometer 38.

When the cable 24 is not stationary and not at an equilibrium position, there is still a force or tension within the cable 24 due to the combined weight of the cable 24 and the sonde 18 and the acceleration of the cable and the sonde. The actual downhole distance 78 of the cable 24 can be determined in terms of the odometer indicated cable length 76 and the stretch of the cable 24 from an equilibrium position, as shown in Equation (2):

$$X_D = X_O + X_S \qquad (2),$$

where $X_D$ is the actual downhole cable length 78, $X_O$ is the odometer indicated cable length 76 and $X_S$ is the stretch or elongation of the cable, which is also the displacement of the sonde 18 from the position that the sonde 18 would otherwise occupy when the cable 24 is in the equilibrium state. Substituting Equation (1) into Equation (2) yields Equation (3):

$$X_D = X_O + F/k \qquad (3).$$

The force F can be represented in terms of tension within the cable, as shown in Equation (4):

$$F = (T_A - T_E) \qquad (4),$$

where $T_A$ is the actual average cable tension and $T_E$ is the expected average cable tension when the cable is in the state of equilibrium. $T_A$ and $T_E$ are instantaneous values. Both $T_A$ and $T_E$ are taken or calculated at the same instant at each measurement point.

The actual average cable tension $T_A$ at each measurement point is determined as the average of tension measurements taken from an upper cable tension sensor 36 and a lower cable tension sensor 26, as shown in FIG. 1. The alignment pulley 32 is pivotally connected to the tower 34 by a horizontal control arm 35 and by the upper cable tension sensor 36. The control arm 35 extends horizontally from the alignment pulley 32 in a direction opposite from the position of the cable truck 30 with respect to the alignment pulley 32. The control arm 35 counters the horizontal forces caused by the cable 24 bending around the alignment pulley 32 and extending to the motorized spool 28. The upper cable tension sensor 36 is subject to the force from the combined weight of the sonde 18 and the cable 24 extended into the borehole 10. The upper cable tension sensor 36 supplies a signal corresponding to the weight of the sonde 18 and the weight of that portion of cable 24 within the borehole 10.

The lower cable tension sensor 26 connects the sonde 18 to a lower end of the cable 24. The lower cable tension sensor 26 supplies a signal corresponding to the force exerted on the lower end of the cable 24 by the weight of the sonde 18 and by acceleration of sonde 18 caused by its movement. The signals from the lower cable tension sensor 26 are communicated to the data recording equipment 25 through the communication conductors of the cable 24, and signals from the upper cable tension sensor 36 are communicated to the data recording equipment 25 by conductors extending therebetween.

The expected average cable tension $T_E$ on the cable 24 represents the average cable tension acting throughout the entire length of cable indicated by the odometer 38 within the borehole. There is an expected average cable tension $T_E$ which corresponds to each possible value of the odometer-indicated cable length, because the cable has a predetermined weight per unit of length, and the weight of the sonde 18 connected to the lower cable tension sensor 26 is known and remains constant except for insignificant changes resulting from changes in gravity. The expected average cable tension $T_E$ is therefore directly related to the weight per unit of length and the number of units of length of the cable 24 in the borehole 10 and the weight of the sonde 18. Typically, the expected average cable tension per unit length of the cable 24 is available or determinable from information from a manufacturer of the cable. The expected average cable tension $T_E$ is derivable from an equation which uses the odometer indicated cable length as an input value.

Substituting Equation (4) into Equation (3) and letting K=1/k to remove the spring constant term from the denominator of Equation (3) yields Equation (5):

$$X_D = X_O + K(T_A - T_E) \qquad (5)$$

Equation (5) shows that the actual downhole cable distance $X_D$ equals the odometer indicated cable distance $X_O$ only when the cable 24 is in a state of equilibrium, i.e. when the actual average cable tension $T_A$ is equal to the expected average cable tension $T_E$. When the actual average cable tension $T_A$ is equal to the expected average cable tension $T_E$, the stretch modifier term of Equation (5) ($K(T_A-T_E)$) is equal to zero, and the actual downhole length of the cable is equal to odometer indicated cable length.

The term $K(T_A-T_E)$ is referred to herein as a stretch modifier and may have a positive or negative value at any particular point in time. The actual downhole cable length is the sum of the indicated cable length plus the stretch modifier. The stretch modifier will be positive when the actual average cable tension $T_A$ is greater than the expected average cable tension $T_E$, and the stretch modifier will be negative when the actual average cable tension $T_A$ is less than the expected average cable tension $T_E$.

When the cable 24 and sonde 18 are subject to external accelerations, the actual average cable tension will differ from the expected average cable tension by the influence of the external accelerations caused by disturbances and perturbations of the cable 24 and sonde 18. For example, at an instant in time during which the actual average tension within the cable is less than the expected average cable tension, the actual downhole cable length will be reduced, and the stretch modifier term ($K(T_A-T_E)$) of Equation (5) will be negative. Conversely, at an instant in time during which the actual average tension within the cable is greater than the expected average cable tension, the actual downhole cable length will be extended and the stretch modifier term ($K(T_A-T_E)$) of Equation (5) will be positive. These variations in cable length result from the spring characteristics of the cable, and these variations occur when the cable oscillates or stretches due to its elastic spring characteristic response induced by accelerations.

Knowledge of the borehole topography can also be obtained by sampling the signals 69, 70, 61 and 63 as the sonde 18 is lowered into or raised from the borehole 10. However, the signals 69, 70, 61 and 63 cannot, by themselves, be used to accurately map the borehole topography due to the unpredictable rotation of the sonde 18 about its longitudinal axis within the borehole 10. A Z-axis gyroscope 79 (FIG. 3) is mounted to the stabilized platform 50 and supplies signals which relate to the degree of rotation of the sonde 18 about the vertical axis. As an alternative to using pre-existing borehole deviation information, accurate borehole deviation information can be calculated from the signals supplied by the Z-axis gyroscope 79 and the X-axis and Y-axis accelerometers 65 and 67, as described below.

In accordance with established inertial navigation theory, the movement or position of the sonde 18 along the X and Y axes is determined by doubly integrating the X-axis and Y-axis accelerometer signals 61 and 63 with respect to time. Rotation of the sonde 18 along the Z axis also rotates the X and Y axes with respect to a fixed reference frame, such as the cartesian axes (North-South, East-West). The degree of rotation of the X and Y axes about the fixed reference frame is determined by integrating the signal supplied by the Z-axis gyroscope 79, using Equation (6):

$$\theta = \int \dot{\theta} dt + \theta_0, \qquad (6)$$

where $\theta$ represents the degree of rotation of the X and Y axes about the fixed reference frame, $\dot{\theta}$ represents the angular velocity of the rotation of the X and Y axes about the fixed reference frame, and $\theta_0$ represents the initial degree of rotation of the X and Y axes about the fixed reference frame. The signals 61 and 63 from the accelerometers 65 and 67 represent acceleration in the X and Y axes. These signals 61 and 63 (represented by the variables $a_x$ and $a_y$) are mapped to the fixed coordinate system using commonly known transforms, as shown in the following Equations (7) and (8):

$$a_N = a_X \cos\theta + a_Y \sin\theta \qquad (7)$$

and $$a_E = a_Y \cos\theta - a_X \sin\theta, \qquad (8)$$

where $a_N$ and $a_E$ respectively represent the acceleration along the North-South and East-West axes in the fixed reference plane, $a_X$ and $a_Y$ respectively represent acceleration in the X and Y axes, and $\theta$ is the degree of rotation between the X and Y axes and the fixed reference plane from Equation (6). These acceleration variables $a_N$ and $a_E$ from Equations (7) and (8) are then twice integrated to get the change in position from the starting position in the fixed N-S and E-W axes, using equations (9) and (10):

$$P_N = \iint a_N d^2 t \qquad (9)$$

$$P_E = \iint a_E d^2 t \qquad (10),$$

where $P_N$ represents the change in position along the fixed N-S axis and $P_E$ represents the change in position along the fixed E-W axis. The terms $P_N$ and $P_E$ are often referred to together in a two element array as $P_{N,E}$. The true vertical depth 75 ("TVD," FIG. 5) can then be calculated from $P_{N,E}$ and the actual downhole cable length 78 ("ADCL," FIG. 5) from the Pythagorean Theorem shown as Equation (11):

$$TVD = [(ADCL)^2 - (P_{N,E})^2]^{0.5} \qquad (11)$$

The actual downhole cable length 78 (ADCL) is determined as previously described, or may be determined by another known method. The borehole deviation from vertical is then given by Equation (12):

$$\alpha = \sin^{-1}(P_{N,E}/ADCL) \qquad (12)$$

The signals 61 and 63 from the X-axis and Y-axis accelerometers 65 and 67 and the Z-axis gyroscope 79 are preferably sampled and stored by the data recording equipment 25 (FIG. 1) at frequent intervals so that the above borehole deviation related calculations can be performed for short time intervals which more accurately models the borehole geometry.

The effects of the external accelerations on the gravity meter 16 are calculated once the true vertical depth 75 of the sonde from the surface 14 of the earth 15 has been determined. The effects of the external accelerations of the gravity meter are reflected in the second derivative with respect to time of the true vertical depth of the gravity meter 16 and sonde 18. The first derivative with respect to time of the true vertical depth of the gravity meter 16 and sonde 18 represents the true vertical velocity at which the gravity meter 16 and sonde 18 are moving at that point.

Since the motorized spool 28 takes up the cable at a desired constant velocity, variations in the actual average cable tension principally measured by the sensors 26 and 36 from the expected average cable tension represent disturbances, perturbations and movement-induced accelerations on the gravity meter 16 and sonde 18. It is these movement-induced accelerations which cause errors in the gross gravity meter measurement. It is necessary to quantify and subtract these acceleration-induced errors to obtain an accurate gravity measurement. The value of the movement-induced acceleration errors is obtained by taking the second derivative with respect to time of the true vertical depth 75.

The values measured during the gravity survey are preferably recorded concurrently and the calculations performed at a later time, or the values are measured and the calculations are performed contemporaneously. Furthermore, the gravity survey values are preferably taken at the same measurement points at which the gross gravity meter measurements are taken, although this is not necessarily a requirement. The gravity survey values could also be taken at positions other than the measurement points, and then measured values interpolated to the measurement points. For convenience in the following description, the gross gravity measurements, the odometer values, and the tension sensor values are all discrete values which are recorded simultaneously at correlated measurement points. Alternatively, the measured values could be obtained at regular time intervals at a predetermined frequency, such as 100 Hz.

Figure 6:
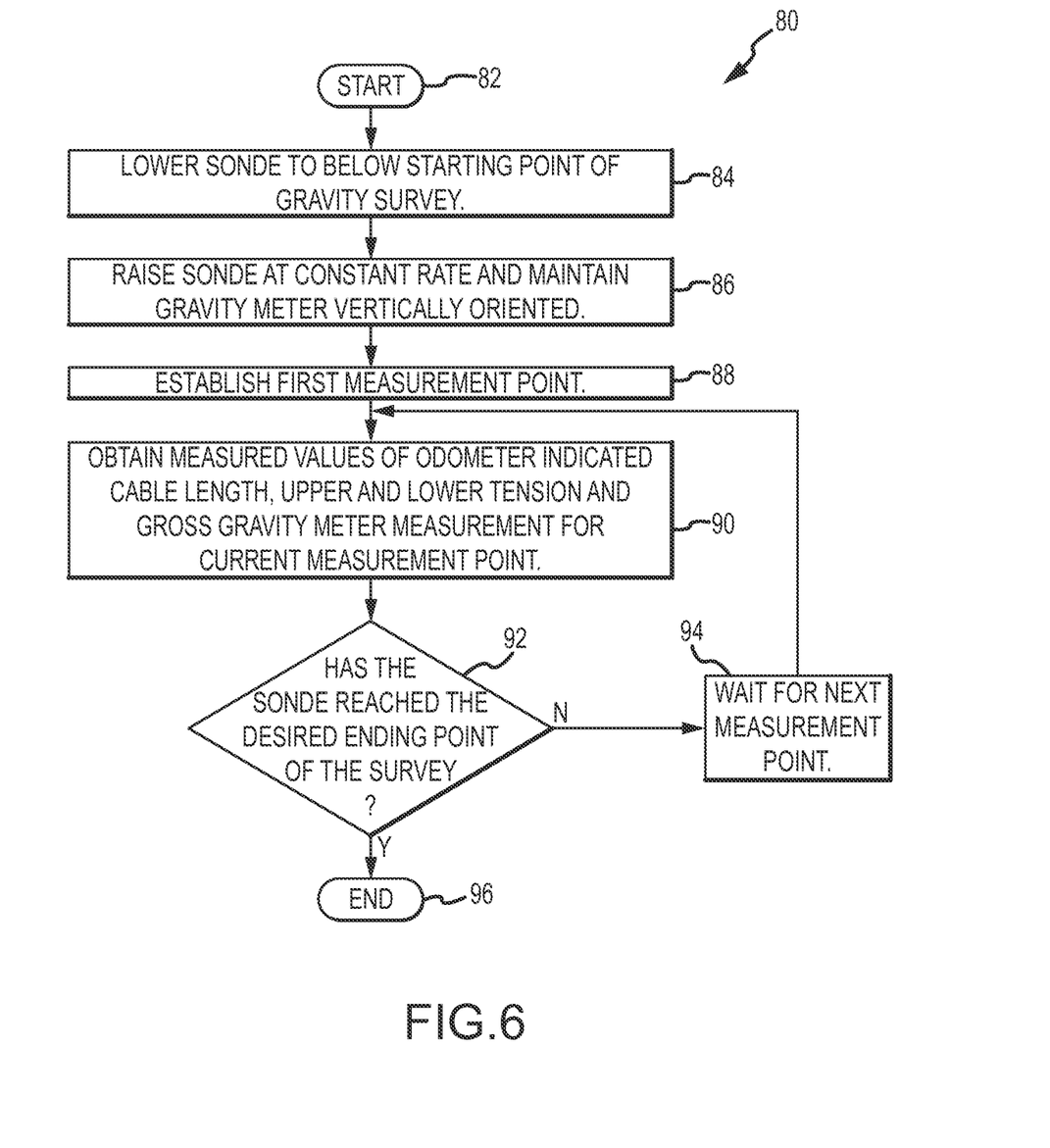
FIG. 6 is a flow chart showing a process for continuously recording measurement values in accordance with the invention.

An exemplary process flow 80 for recording values during the gravity survey is shown in FIG. 6, with reference to FIGS. 1 and 2. The process flow 80 starts at 82. At 84, the sonde 18 is lowered into the borehole 10 to below a desired lowermost starting depth for the gravity survey. The motorized spool 28 is then rotated, at 86, to take-up or raise the cable 24 from the borehole 10 at a constant rate or velocity, while the control circuitry 68 (FIGS. 3 and 4) keeps the gravity meter 16 (FIG. 2) oriented by maintaining the stabilized platform 50 in a horizontal orientation.

A first measurement point (time or depth interval) for taking and recording the measured values is then established at 88. At 90, measured values are obtained from the gravity meter 16 (FIG. 1), from the lower and upper tension sensors 26 and 36 (FIG. 1), and from the odometer 38 (FIG. 1). The values obtained at 90 are written into memory of the data recording equipment 25. The values 90 are obtained while the gravity meter 16 is moving continuously upward within the borehole 10 at the measurement point established at 88.

A determination is then made, at 92, whether the sonde 18 has reached the desired ending point of the gravity survey. The ending point of the gravity survey is the uppermost depth or position within the borehole, when the gravity survey starts at a lower position and finishes at an upper position. If the determination at 92 is negative the process flow 80 continues to 94 where the process flow 80 waits until the next measurement point arrives. When the next measurement point arrives, the process flow 80 loops back to 90 and the measured values are obtained and recorded for that measurement point. The looping between 94 and 90 occurs to achieve a desired number of vertically spaced (in the borehole) and correlated measured values accumulated over the entire length of the gravity survey. Once the determination at 92 is affirmative, signifying the end of the gravity survey, the process flow 80 ends at 96.

In the process flow 80, the values of the upper and lower cable tension required to determine the vertical acceleration of the sonde are taken simultaneously and are taken concurrently with the gross gravity meter measurements from the displacement measurement sensor 46 (FIG. 2). The present invention also contemplates measuring and recording some of the values at different rates, but nevertheless in a coordinated or correlated manner. For example, the upper and lower cable tension values may be measured and recorded more frequently than the gross gravity meter measurements to obtain more accurate values of the acceleration errors which are subtracted from the gross gravity meter measurements to obtain the accurate gravity measurements.

Figure 7:
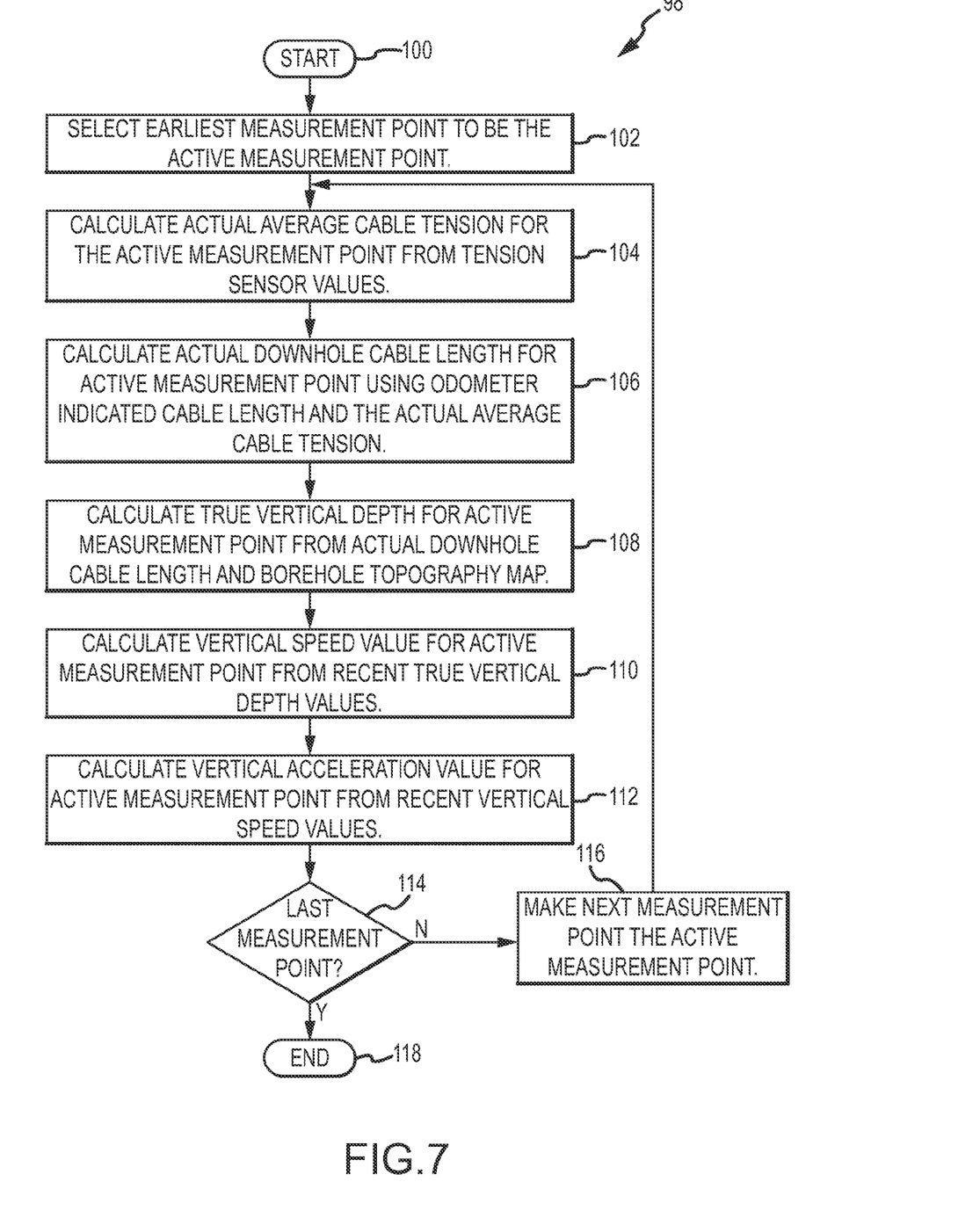
FIG. 7 is a flow chart showing a process for calculating vertical acceleration of the gravity meter in accordance with the invention.

An exemplary process flow 98 for calculating vertical acceleration values used for correcting the gross gravity meter measurement values to compensate for the movement-induced acceleration errors caused by perturbations or disturbances of the sonde is shown in FIG. 7. The process flow 98 is executed by a computer with access to the measured values obtained from the process flow 80 (FIG. 6) which were stored in the memory of the data recording equipment 25 (FIG. 1). The process flow 98 may be executed approximately concurrently with the process flow 80 or some time after the process flow 80 has completed. The process flow 98 starts at 100.

At 102 the earliest measurement point is identified and becomes the active measurement point. Then, at 104, the actual average cable tension ($T_A$) for the active measurement point is calculated from the upper and lower tension sensor values associated with the active measurement point and from the measured weight of the sonde, as described above. The actual downhole cable length for the active measurement point is then calculated, at 106, from the odometer value and from the actual average cable tension calculated at 104 for the active measurement point, as previously described. A true vertical depth value for the active measurement point is then calculated at 108. The vertical depth value is calculated from the actual downhole cable length determined at 106 for the active measurement point and from pre-existing or derived topography information of the borehole, as previously described.

At 110, a vertical speed value for the active measurement point is calculated. The vertical speed value for the active measurement point is calculated by determining the vertical distance that the gravity meter has traveled between the active measurement point and the previous measurement point, or from two other closely related distance calculations, and dividing that traveled vertical distance by the time interval between successive measurement points or depth calculation points. In general, the vertical speed value calculated at 110 is the first derivative of the function which defines the true vertical depth.

A vertical acceleration value of the gravity meter in the sonde for the active measurement point is then calculated at 112. The vertical acceleration value for the active measurement point is calculated by determining the change in vertical speed between the active measurement point and the previous measurement point, or from two other closely related velocity calculations, and dividing that change in vertical speed by the time interval between successive measurement points. In general, the acceleration value calculated at 112 is the second derivative of the function which defines the true vertical depth.

A determination is then made at 114 whether the active measurement point is the last measurement point of the gravity survey associated with the values acquired from the process flow 80 (FIG. 5). If the determination at 114 is negative, the process flow 98 continues to 116, where the next measurement point of the gravity survey is made the active measurement point, and the process flow 98 loops back to 104, where the process 98 repeats for the next active measurement point. If the determination at 114 is affirmative, the process flow ends at 118.

Execution of the process flow 98 leads to a vertical acceleration value (calculated at 112) which corresponds to the vertical acceleration error within the gross gravity meter measurements taken at the corresponding measurement points. Actual gravity values are obtained by subtracting the vertical acceleration values obtained from the process flow 98 from the gross gravity meter measurements obtained from the process flow 80 (FIG. 6).

Figure 8:
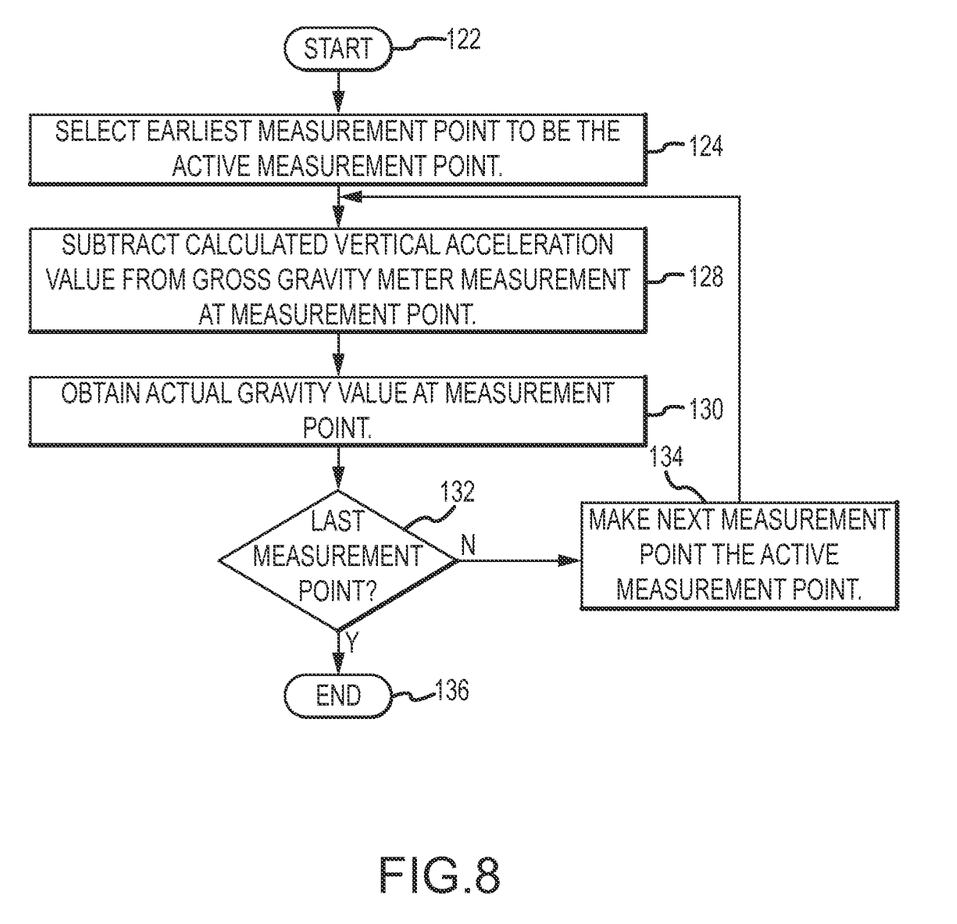
FIG. 8 is a flow chart showing a process for calculating actual gravity values in accordance with the invention.

The process flow 120 which subtracts the acceleration errors from the gross gravity measurements to obtain the actual gravity values is shown in FIG. 8 and starts at 122. At 124 the earliest measurement point is identified and becomes the active measurement point. At 128, the calculated vertical acceleration value at the measurement point is subtracted from the gross gravity meter measurement at the active measurement point. The result obtained from the subtraction at 128 is the actual gravity value for that measurement point, which is shown in 130.

A determination is then made at 132 whether the active measurement point is the last measurement point of the gravity survey associated with the values acquired from the process flow 80 (FIG. 6). If the determination at 132 is negative, the process flow 120 continues to 134, where the next measurement point of the gravity survey is made the active measurement point, and the process flow 120 loops back to 128, where the process 120 repeats for the next active measurement point. If the determination at 132 is affirmative, the process flow ends at 136.

Execution of the process flow 120 leads to actual gravity values at each of the measurement points. However, both the vertical acceleration values and the gross gravity meter measurements used in obtaining the actual gravity values for some of the measurement points may contain excessive amounts of noise or spurious variations which could result in actual gravity values for those measurement points which have greater deviation than desired. To enhance the actual gravity values, both the gravity measurements and the corresponding vertical acceleration values are preferably smoothed to reduce noise and deviation prior to subtracting the vertical acceleration values from the gravity measurements to obtain the actual gravity values (130, FIG. 8).

Figure 9:
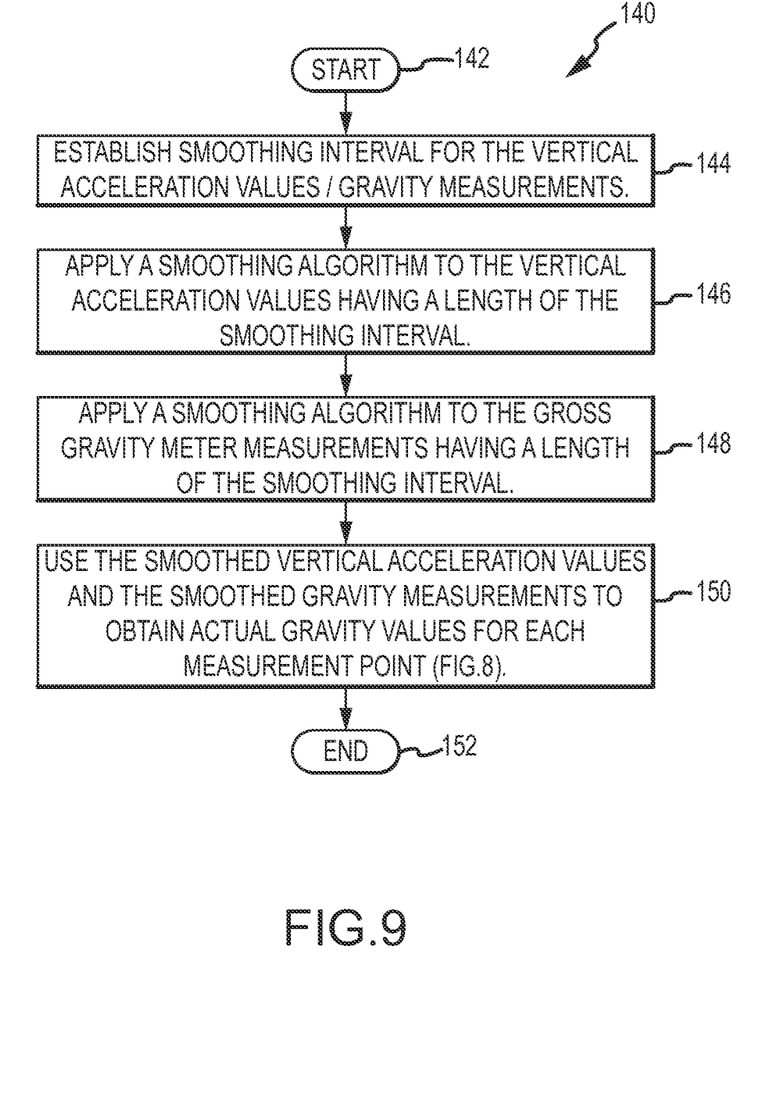
FIG. 9 is a flow chart showing a process for smoothing vertical acceleration values and calculated gravity values and for obtaining actual gravity values in accordance with the invention.

A process flow 140 using smoothed vertical acceleration values and smoothed gross gravity meter measurements to calculate actual gravity values is shown in FIG. 9. The process flow 140 starts at 142. At 144, a smoothing interval is established for the calculated vertical acceleration values obtained from executing the process flow 98 (FIG. 7) and for the gross gravity meter measurements obtained from executing the process flow 80 (FIG. 6). The smoothing interval establishes the number of successive measurement points over which the data will be smoothed. Although a single smoothing interval is established at 144 for both the vertical acceleration values and the gross gravity meter measurements, it may be desirable to establish different smoothing intervals for the vertical acceleration values compared to the gross gravity meter measurements. Different smoothing intervals may be desirable if the odometer values and tension sensor values are obtained at a frequency or rate different from the rate of obtaining the gross gravity meter measurements, among other reasons.

A smoothing algorithm is applied to the vertical acceleration values at 146 using the smoothing interval established at 144. The smoothing algorithm reduces the noise and spurious variations within the vertical acceleration values. The smoothing algorithm is of a type suitable for use with digital data associated with discrete measurement points, such as a finite impulse response (FIR) filter. At 148, a smoothing algorithm is also applied to the gross gravity meter measurements using the smoothing interval established at 144. The smoothing algorithm applied to the gross gravity meter measurements may be the same smoothing algorithm applied to the vertical acceleration values at 146 or may be a different smoothing algorithm. The smoothed vertical acceleration values and the corresponding smoothed gross gravity meter measurements are then used (130, FIG. 8) to obtain the actual gravity values (FIG. 8). The process flow 140 ends at 152.

The gravity survey of a borehole conducted in accordance with the present invention is completed in less time than the previously known discontinuous gravity surveys of boreholes in which the gravity meter is stopped at each measurement point to make each gravity measurement after allowing a sufficient amount of time to elapse to dampen out the extraneous motion of the cable and the test mass. The gravity meter 16 supplies gravity measurements as the gravity meter 16 and the sonde 18 move continuously within the borehole 10 (FIG. 1), preferably while moving up the borehole. Since the gravity meter 16 and sonde 18 do not stop and wait at preselected measurement points in accordance with the present invention, the gravity survey of the entire borehole 10 is completed in a shorter time. The speed at which the sonde is moved in the borehole is greater than the overall average speed at which the sonde is raised in a discontinuous gravity survey, taking into account that the sonde must be stopped and allowed to stabilize at each of the measurement points. Completing a borehole gravity survey in a shorter amount of time reduces the time and cost to conduct the survey.

These and other improvements and advantages will be more apparent after fully comprehending all of ramifications of the present invention. Presently preferred embodiments of the invention and many of its improvements have been described with a degree of particularity. The description is of preferred examples of implementing the invention, and is not necessarily intended to limit the scope of the invention. The scope of the invention is defined by the following claims.

What is claimed:

1. A method of conducting a gravity survey of a borehole having a depth using a gravity meter, comprising:
continuously moving the gravity meter within the borehole along a predetermined measurement length over which the gravity survey is conducted;
taking gross gravity meter measurements from the gravity meter at measurement points along the measurement length while continuously moving the gravity meter;
determining a true vertical depth of the gravity meter within the borehole at each measurement point;
determining a vertical acceleration of the gravity meter at each measurement point;
subtracting the determined vertical acceleration from the gross gravity meter measurement at each measurement point to obtain actual gravity values at each measurement point; and
correlating the actual gravity values to the true vertical depth of each measurement point.

2. A method as defined in claim 1, further comprising:
determining the vertical acceleration of the gravity meter at each measurement point by performing a mathematical calculation using the determined true vertical depth.

3. A method as defined in claim 2, further comprising:
determining the vertical acceleration of the gravity meter at each measurement point from a second differential of the determined true vertical depth with respect to time.

4. A method as defined in claim 1, further comprising:
orienting the gravity meter to take gross gravity meter measurements with respect to a vertical reference at each measurement point.

5. A method as defined in claim 1, further comprising:
determining the true vertical depth of the gravity meter within the borehole at each measurement point by use of topography information of the borehole at each measurement point.

6. A method as defined in claim 1, further comprising:
obtaining smoothed values of the vertical acceleration determined at each measurement point using a smoothing algorithm;
obtaining smoothed values of the gross gravity meter measurements at each measurement point using a smoothing algorithm; and
subtracting the smoothed value of vertical acceleration from the smoothed value of the gross gravity meter measurement at each measurement point to obtain actual gravity values at each measurement point.

7. A method as defined in claim 1, further comprising:
determining vertical velocity of the gravity meter at each measurement point; and
determining vertical acceleration of the gravity meter at each measurement point by determining a change in vertical velocity of the gravity meter at each measurement point.

8. A method as defined in claim 1, wherein the borehole extends downward from a surface of the earth, the borehole has a particular topography at each measurement point, and the method further comprises:
suspending the gravity meter within the borehole by a cable extending into the borehole;
continuously moving the gravity meter by changing the amount of cable extending into the borehole;
determining an actual stretched length of the cable extended into the borehole at each measurement point; and
determining the true vertical depth associated with each measurement point from the actual stretched length of the cable and the topography of the borehole at each measurement point.

9. A method as defined in claim 8, wherein the cable has predetermined weight characteristics, the method further comprising:
measuring tension in the cable at the surface;
measuring tension in the cable at the gravity meter;
measuring the actual stretched length of the cable extended into the borehole; and
determining the true vertical depth of the gravity meter at each measurement point using the predetermined weight characteristics of the cable, the actual stretched length of the cable extended into the borehole, the tension in the cable measured at the surface and the tension in the cable measured at the gravity meter.

10. A method as defined in claim 9, further comprising:
at each measurement point correlating the gross gravity meter measurement from the gravity meter, the measured actual stretched length of cable, the measured tension in the cable at the surface, and the measured tension in the cable at the gravity meter; and
using the correlated values to determine actual gravity values at each measurement point.

11. A method as defined in claim 8, further comprising:
conducting the gravity survey by continuously moving the gravity meter within the borehole from a lowermost measurement point of the predetermined measurement length to an uppermost measurement point of the predetermined length, with reference to the depth of the borehole from the surface.

12. A method as defined in claim 8, further comprising:
obtaining the borehole topography information from the movement of the gravity meter within the borehole.

13. A method as defined in claim 12, further comprising:
establishing a coordinate system in three dimensional space having perpendicular X and Y axes which are orthogonal to a vertical Z axis; and
obtaining borehole topography information by determining coordinates along the X and Y axes at a plurality of different depths of the borehole by measuring acceleration of the gravity meter along the X and Y axes as the gravity meter is continuously moving within the borehole; and
double integrating the measured acceleration of the gravity meter along the X and Y axes to determine the coordinates of the borehole along the X and Y axes at the plurality of different depths of the borehole.

14. A method as defined in claim 13, further comprising:
determining an amount of rotation of the gravity meter around the Z axis at each of the plurality of depths within the borehole; and
determining the coordinates of the borehole along the X and Y axes by utilizing the determined amount of rotation of the gravity meter in the Z axis.

15. A method as defined in claim 1, further comprising:
utilizing a stabilized platform within the interior of the sonde to retain the gravity meter within an interior of a sonde;
using a gimbal ring connected to the stabilized platform to pivot the stabilized platform about first and second mutually perpendicular axes within the sonde;
supplying a first axis pivot signal related to a degree of pivot of the stabilized platform about the first axis;
supplying a second axis pivot signal related to a degree of pivot of the stabilized platform about the second axis;
using a first motor connected to the gimbal ring to pivot the stabilized platform about the first axis;
using a second motor connected to the gimbal ring to pivot the stabilized platform about the second axis; and
continuously maintaining the gravity meter in a vertical orientation as the gravity meter is moved along the predetermined measurement length of the borehole by controlling the first and second motors in response to the first and second axis pivot signals.

16. A method of conducting a borehole gravity survey of a borehole beneath the surface of the earth using a gravity meter, the gravity meter supplying gross gravity meter measurements related to the gravity at the location of the gravity meter and acceleration of the gravity meter due to vertical acceleration of the gravity meter when the gross gravity meter measurements are taken, comprising:
establishing a starting depth for the gravity survey within the borehole;
establishing a finishing depth for the gravity survey within the borehole;
positioning the gravity meter at the starting depth within the borehole;
moving the gravity meter continuously from the starting depth to the finishing depth;
keeping the gravity meter in a vertical orientation by leveling the gravity meter as the gravity meter is continuously moved from the starting depth to the finishing depth;
obtaining gross gravity meter measurements from the gravity meter at a plurality of measurement points as the gravity meter is leveled and moving continuously between the starting depth and the finishing depth;
calculating vertical acceleration values corresponding to the vertical acceleration of the gravity meter at each of the measurement points; and
calculating actual gravity values at each measurement point by subtracting the calculated vertical acceleration values from the gross gravity meter measurements obtained at each one measurement point.

17. A method as defined in claim 16, further comprising:
locating the gravity meter within a sonde;
suspending the sonde within the borehole by a cable; and
moving the cable in the borehole at the surface at a substantially constant speed to move the sonde continuously within the borehole to conduct the gravity survey.

18. A method as defined in claim 17, further comprising:
calculating true vertical depth values of the gravity meter at each one measurement point; and
calculating the vertical acceleration values by taking the second derivative of the true vertical depth values with respect to time at each one measurement point.

19. A method as defined in claim 18, further comprising:
determining cable length at each one measurement point; and
obtaining knowledge of a topography of the borehole; and
calculating the vertical depth values from the cable lengths and the topography of the borehole at each one measurement point.

20. A method as defined in claim 16, further comprising:
using a stabilized platform to support the gravity meter within the sonde;
using a gimbal ring to pivot the stabilized platform about a first axis;
pivoting the gimbal ring about the second axis which is perpendicular to the first axis within the sonde;
supplying a first axis pivot signal indicating a degree of pivot of the stabilized platform about the first axis;
supplying a second axis pivot signal indicating a degree of pivot of the stabilized platform about the second axis;
using first and second motors to pivot the stabilized platform about the first and second axes; and
leveling the gravity meter in the vertical orientation by controlling the first and second motors in response to the first and second axis pivot signals to orient the gravity meter to obtain the gross gravity meter measurements relative to vertical.

* * * * *